(No Model.)

H. WOJAN.
VALVE GEAR.

2 Sheets—Sheet 1.

No. 558,544. Patented Apr. 21, 1896.

Witnesses:
John Becker
Frederick Seibel

Inventor:
Hermann Wojan
by his attorneys
Roeder & Briesen (No Model.) 2 Sheets—Sheet 2.

H. WOJAN.
VALVE GEAR.

No. 558,544. Patented Apr. 21, 1896.

Witnesses:
John Becker
Frederick Seibel

Inventor:
Hermann Wojan
by his attorneys
Roeder & Briesen

UNITED STATES PATENT OFFICE.

HERRMANN WOJAN, OF BROOKLYN, NEW YORK.

VALVE-GEAR.

SPECIFICATION forming part of Letters Patent No. 558,544, dated April 21, 1896.

Application filed November 7, 1895. Serial No. 568,213. (No model.)

*To all whom it may concern:*

Be it known that I, HERRMANN WOJAN, of Brooklyn, New York, have invented an Improved Valve-Gear, of which the following is a specification.

This invention relates to a valve-gear so constructed that the valve may be operated quickly and positively by a comparatively short stroke of the operating-arm.

The invention is designed to be applied to valves generally that regulate the discharge of steam or gases, and where a quick response to the action of the operating mechanism is desired.

Figure 1:
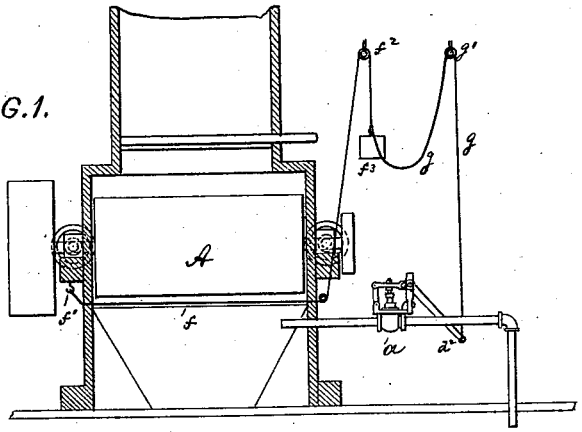
Figure 2:
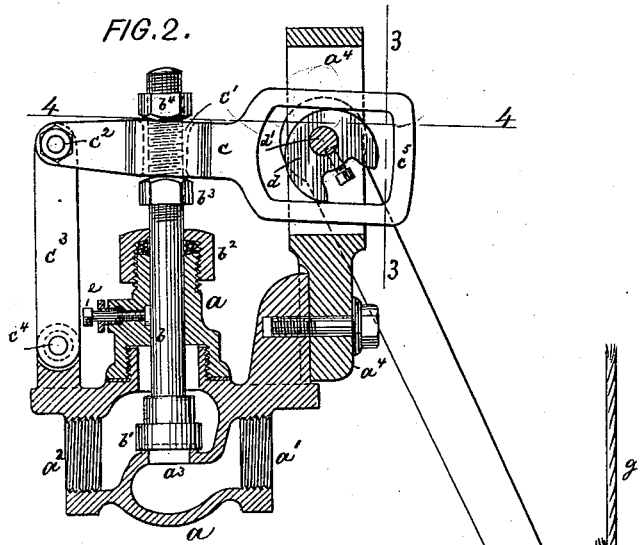
Figure 3:
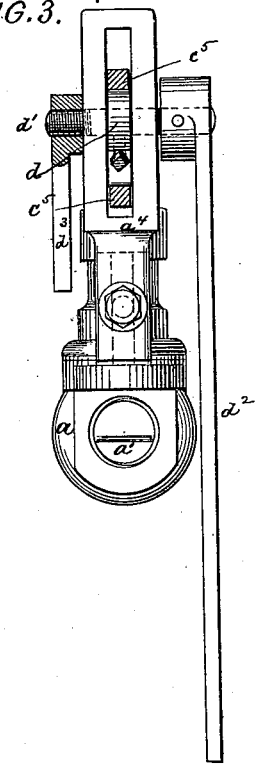
Figure 4:
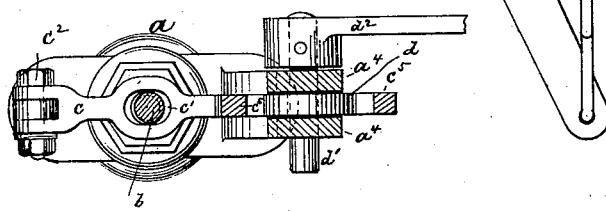
Figure 5:
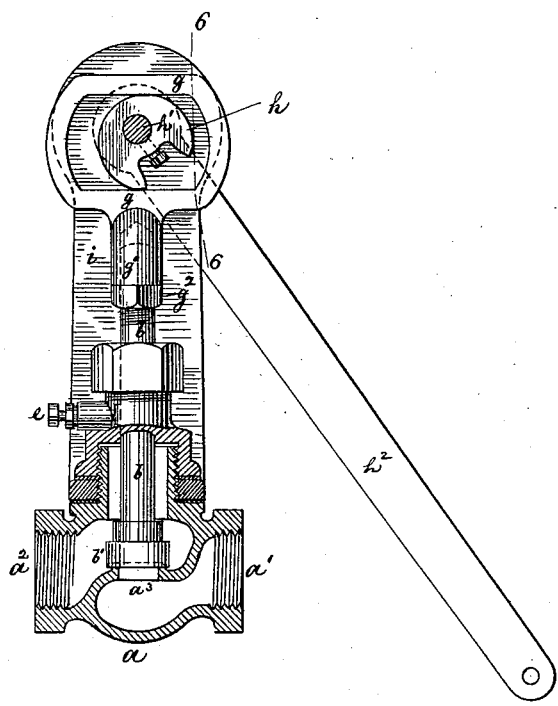

In the accompanying drawings, Figure 1 is a vertical section of a malt-mill provided with my improved valve-gear. Fig. 2 is a longitudinal section, partly in elevation, of the valve-gear; Fig. 3, a section on line 3 3, Fig. 2; Fig. 4, a section on line 4 4, Fig. 2; Fig. 5, a longitudinal section of a modification; and Fig. 6, a section on line 6 6, Fig. 5.

The letter $a$ represents the valve-casing, having ingress and egress ports $a'$ $a^2$ and the intermediate valve-seat $a^3$. The stem $b$ of valve $b'$ is surrounded by the stuffing-box $b^2$ and provided at its upper threaded end with a pair of nuts or shoulders $b^3$ $b^4$. Between these nuts the valve-stem passes through an elongated eye $c'$, Fig. 4, of a yoke-shaped lever $c$. This lever is pivoted at one end by pivot $c^2$ to a link $c^3$, which in turn is pivoted to the valve-casing $a$ by pivot $c^4$. The free end of the lever $c$ terminates in the yoke $c^5$, which projects between and is guided by the cheeks of a slotted arm or extension $a^4$, forming part of the valve-casing. The yoke $c^5$ is engaged by a cam $d$, turning with its pivot $d'$, which is hung between the cheeks of the arm $a^4$. Upon opposite ends of this pivot are mounted a handle $d^2$ and a clamp-nut $d^3$, of which the nut $d^3$ is adapted to be tightened up against one of the cheeks of arm $a^4$, so as to lock the cam in position. The nut $d^3$ is to be tightened up whenever the valve is to be set in a fixed position for the regular and continuous discharge of steam.

It will be seen that by raising or lowering the arm $d^2$ the lever $c$ will be vibrated to quickly open or close the valve. By means of the nuts $b^3$ $b^4$ the length of the valve-stem may be adjusted to compensate for wear in the valve or valve-seat.

In order to lock the valve in its closed position when it is desired to repack the stuffing-box, I employ a screw $e$, that passes through the valve-casing and may be made to bear against the valve-stem $b$.

In Fig. 1 I have shown my valve-gear to be applied to a malt-mill for the purpose of automatically checking spontaneous combustion. Here a combustible cord $f$ passes beneath the grinding-rollers A and is attached at one end to a fixed hook $f'$, while at its other end it passes over a pulley $f^2$ and sustains a suspended weight $f^3$. This weight is, by a slack safety-chain $g$, passing over pulley $g'$, connected to the arm $d^2$. In case of spontaneous combustion the cord $f$ will be ignited and the weight $f^3$, thus released, will drop to pull the valve open and inject steam into the space beneath the grinding-rollers.

Figure 6:
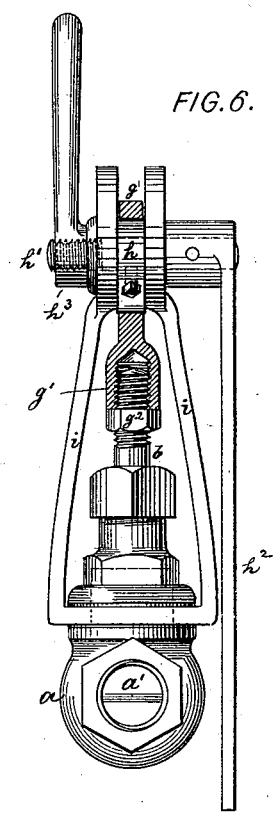

In Figs. 5 and 6 I have shown a modification of my invention. Here a yoke $g$ is adjustably connected to the valve-stem $b$ by the threaded coupling $g'$ and a jam-nut $g^2$. The yoke $g$ is engaged by the cam $h$, pivoted between the two cheeks of the slotted arm $i$, attached to the valve-casing $a$. The pivot $h'$ of the cam carries at one end the operating-arm $h^2$ and at the other end the clamp-nut $h^3$. By operating the arm $h^2$ the yoke is reciprocated and the valve is quickly opened or closed in the manner previously described.

What I claim is—

The combination of a valve-casing having an arm which is slotted to form a pair of cheeks, with a cam pivoted between the cheeks, a yoke surrounding the cam, a handle and jam-nut mounted upon the cam-pivot and of which the jam-nut is adapted to engage one of the cheeks, a valve-stem, and means for adjustably connecting the yoke to the valve-stem, substantially as specified.

H. WOJAN.

Witnesses:
F. V. BRIESEN,
WILLIAM SCHULZ.